(12) United States Patent
Byrne et al.

(10) Patent No.: US 10,037,514 B2
(45) Date of Patent: Jul. 31, 2018

(54) UBIQUITOUS IN-CLOUD MICROSITE GENERATOR FOR HIGH SPEED DATA CUSTOMER INTAKE AND ACTIVATION

(71) Applicant: CenturyLink Intellectual Property LLC, Denver, CO (US)

(72) Inventors: David M. Byrne, Shawnee, KS (US); Michael A. Duree, Independence, MO (US); Kiran D. Kumar, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 602 days.

(21) Appl. No.: 14/478,766

(22) Filed: Sep. 5, 2014

(65) Prior Publication Data

US 2015/0181642 A1 Jun. 25, 2015

Related U.S. Application Data

(60) Provisional application No. 61/918,103, filed on Dec. 19, 2013.

(51) Int. Cl.
*H04L 29/08* (2006.01)
*G06Q 20/16* (2012.01)
*H04L 29/06* (2006.01)

(52) U.S. Cl.
CPC ........... *G06Q 20/16* (2013.01); *H04L 63/102* (2013.01); *H04L 67/20* (2013.01)

(58) Field of Classification Search
CPC ......... G06Q 20/16; H04L 63/00; H04L 63/08; H04L 63/0876; H04L 63/0884; H04L 63/0892; H04L 63/10; H04L 63/102; H04L 63/107; H04L 63/20; H04L 63/205; H04L 67/14; H04L 67/141; H04L 67/20; H04L 67/28; H04L 67/30; H04L 67/305; H04L 67/34

See application file for complete search history.

(56) References Cited

U.S. PATENT DOCUMENTS

| | | | | |
|---|---|---|---|---|
| 5,940,834 A | * | 8/1999 | Pinard | G06F 17/30893 |
| 6,381,645 B1 | * | 4/2002 | Sassin | H04L 29/06 709/203 |
| 6,415,335 B1 | * | 7/2002 | Lowery | G06F 17/30893 707/E17.117 |

(Continued)

*Primary Examiner* — Eric W Shepperd
(74) *Attorney, Agent, or Firm* — Swanson & Bratschun, L.L.C.

(57) ABSTRACT

Novel tools and techniques for implementing a ubiquitous in-cloud microsite solution includes transmitting one or more site parameters from a network device to an in-cloud microsite generator, the network device communicatively coupled to a user device, wherein the network device is configured to allow the user device to communicate over a communications network, generating a microsite based on one or more site parameters from the network device, displaying the microsite generated by the ubiquitous in-cloud microsite generator to the user device, authenticating the user device via the microsite, wherein the microsite performs handshakes between the network device and an at least one second device to authenticate the user device, and allowing the user device to access the communications network once authenticated.

24 Claims, 13 Drawing Sheets

(56) References Cited

U.S. PATENT DOCUMENTS

| | | | | |
|---|---|---|---|---|
| 6,636,894 B1 * | 10/2003 | Short | H04L 12/2856 | 709/225 |
| 6,868,399 B1 * | 3/2005 | Short | G06Q 20/14 | 705/34 |
| 7,350,078 B1 * | 3/2008 | Odom | G06F 21/31 | 713/176 |
| 8,799,993 B1 * | 8/2014 | Efrati | H04L 63/205 | 709/225 |
| 8,811,363 B2 * | 8/2014 | Velasco | H04L 12/1403 | 370/338 |
| 2002/0066033 A1 * | 5/2002 | Dobbins | G06Q 30/0277 | 726/4 |
| 2007/0230457 A1 * | 10/2007 | Kodera | H04L 12/4679 | 370/389 |
| 2008/0140542 A1 * | 6/2008 | Perron | G06Q 20/3224 | 705/27.1 |
| 2008/0201645 A1 * | 8/2008 | Francis | G06F 3/0482 | 715/742 |
| 2011/0231923 A1 * | 9/2011 | Bollay | H04L 63/166 | 726/9 |
| 2011/0258303 A1 * | 10/2011 | Nath | G06F 9/468 | 709/223 |
| 2012/0297190 A1 * | 11/2012 | Shen | H04L 9/0866 | 713/168 |
| 2013/0042312 A1 * | 2/2013 | Wickman | H04L 63/08 | 726/7 |
| 2013/0125225 A1 * | 5/2013 | Candelore | G06F 21/445 | 726/7 |
| 2013/0155876 A1 * | 6/2013 | Potra | H04W 36/14 | 370/248 |
| 2013/0173962 A1 * | 7/2013 | Li | G06F 11/3688 | 714/32 |
| 2013/0305330 A1 * | 11/2013 | Palanigounder | H04L 63/062 | 726/6 |
| 2014/0047510 A1 * | 2/2014 | Belton | H04L 9/32 | 726/4 |
| 2014/0075501 A1 * | 3/2014 | Srinivasan | G06F 21/62 | 726/1 |
| 2014/0379915 A1 * | 12/2014 | Yang | H04L 63/101 | 709/225 |
| 2015/0058133 A1 * | 2/2015 | Roth | G06Q 30/0269 | 705/14.66 |
| 2015/0058926 A1 * | 2/2015 | Archer | H04L 63/10 | 726/3 |

\* cited by examiner

Fig. 4B

UBIQUITOUS IN-CLOUD MICROSITE GENERATOR FOR HIGH SPEED DATA CUSTOMER INTAKE AND ACTIVATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to microsite generation, and more particularly, to techniques for in-cloud micro site generation for high speed data customer intake and activation.

BACKGROUND

Payment based access to wireless networks allow customers to obtain instant access to a wireless network. Traditionally, sites would be installed on a network device, for example, a revenue extraction gateway (RxG or rXG) device. Customers would gain access to the wireless network by entering payment and other information through the site. Information service to the site is managed on the site via a plugin. This task requires administrative access to the network device for installation and maintenance. Thus, sites would have a different plugin source code base that interacted with each network device independently.

These capabilities require high information technology costs of development and maintenance. Thus, a need exists for gaining access to a wireless network with lower information technology costs.

BRIEF SUMMARY

Some embodiments provide tools and techniques for generating sites and interactions with sites to and from gateway devices through a centralized in-cloud micro site.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments might comprise establishing a ubiquitous in-cloud micro site (UICMS) as a centralized website to provide an instant front-end platform for customer interaction. The method includes transmitting one or more site parameters from a network device to an in-cloud microsite generator, the network device communicatively coupled to a user device, wherein the network device provides selective access for user devices to communicate over a communications network. The in-cloud microsite generator generates a microsite based on the one or more site parameters received from the network device, and the microsite generated by the in-cloud microsite generator is displayed to the user device. The microsite authenticates the user device by performing a series of handshakes between the network device and an at least one second device to authenticate the user device. The user device is allowed access to the communications network based on successful authentication of the user device.

A system for UICMS generation, in accordance with another set of embodiments, might comprise an in-cloud microsite generator and a network device communicatively coupled to the in-cloud microsite generator. The network device is configured to communicate with the in-cloud microsite generator, and to communicate with an at least one user device. The in-cloud microsite generator is configured to receive one or more site parameters from the network device, generate a microsite based on the one or more site parameters, and deploy the microsite at the network device. The network device is configured to transmit one or more site parameters to the ubiquitous in-cloud microsite generator, display a microsite generated by the in-cloud microsite generator to the at least one user device, receive user information from the at least one user device via the microsite, perform handshakes with an at least one second device, and allow the at least one user device to access the communications network.

A network device for deploying an in-cloud microsite solution, in accordance with another set of embodiments, comprises a communications unit configured to communicate with an in-cloud microsite generator, the communications unit further configured to allow an at least one user device to communicate over a communications network. The network device includes at least one microprocessor and a non-transitory computer readable medium. The computer readable medium contains instructions that, when executed by the at least one microprocessor, causes the network device to transmit one or more site parameters to the in-cloud microsite generator, display a microsite generated by the in-cloud microsite generator to the at least one user device, perform handshakes via the microsite with an at least one second device, and allow the user device to access a communications network based on the handshakes.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 4B is an example GUI of a sign-up page of the microsite;

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1A:
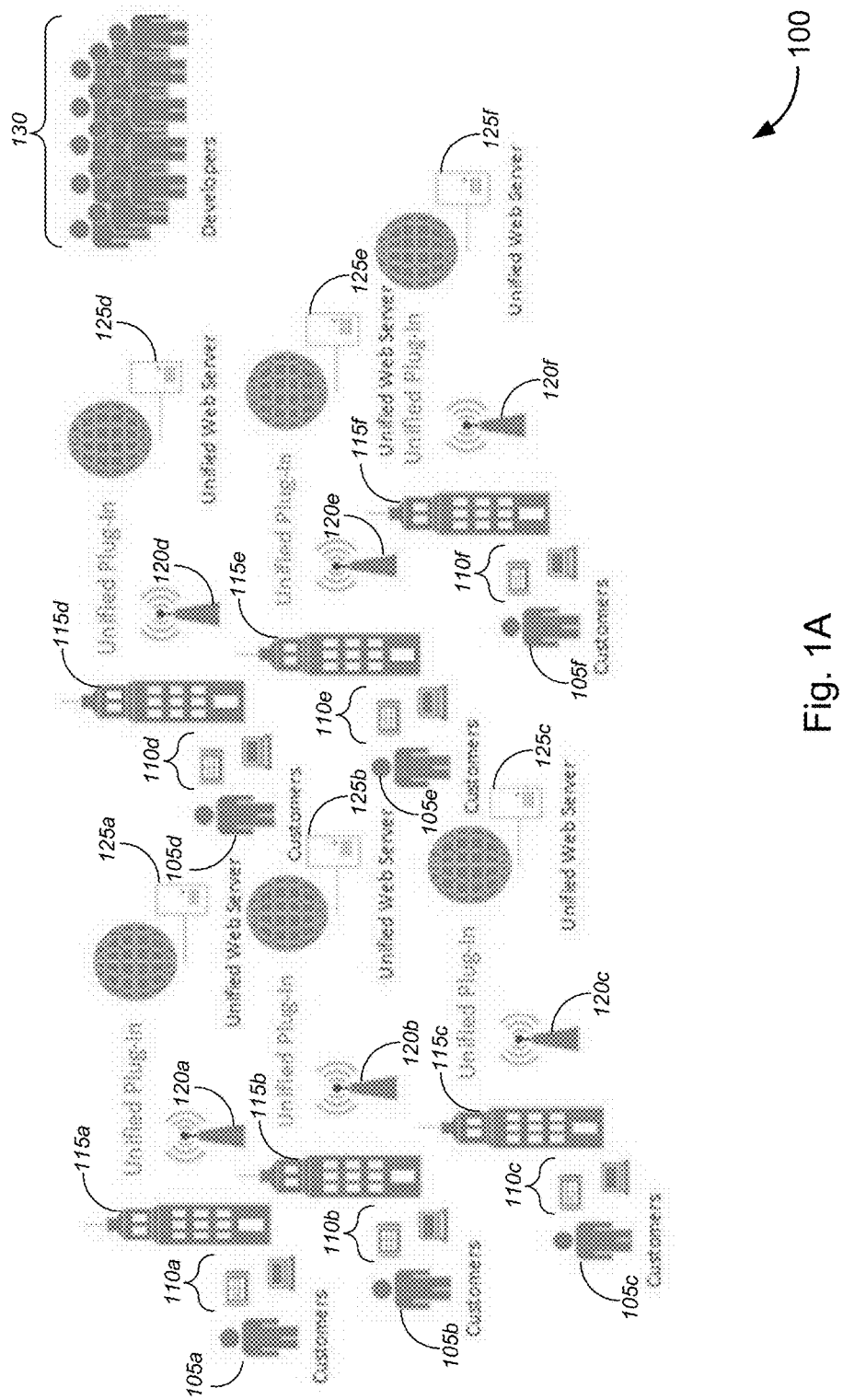
FIG. 1A illustrates network interactions needed to deploy microsites without using an ubiquitous in-cloud microsite solution.
Figure 1B:
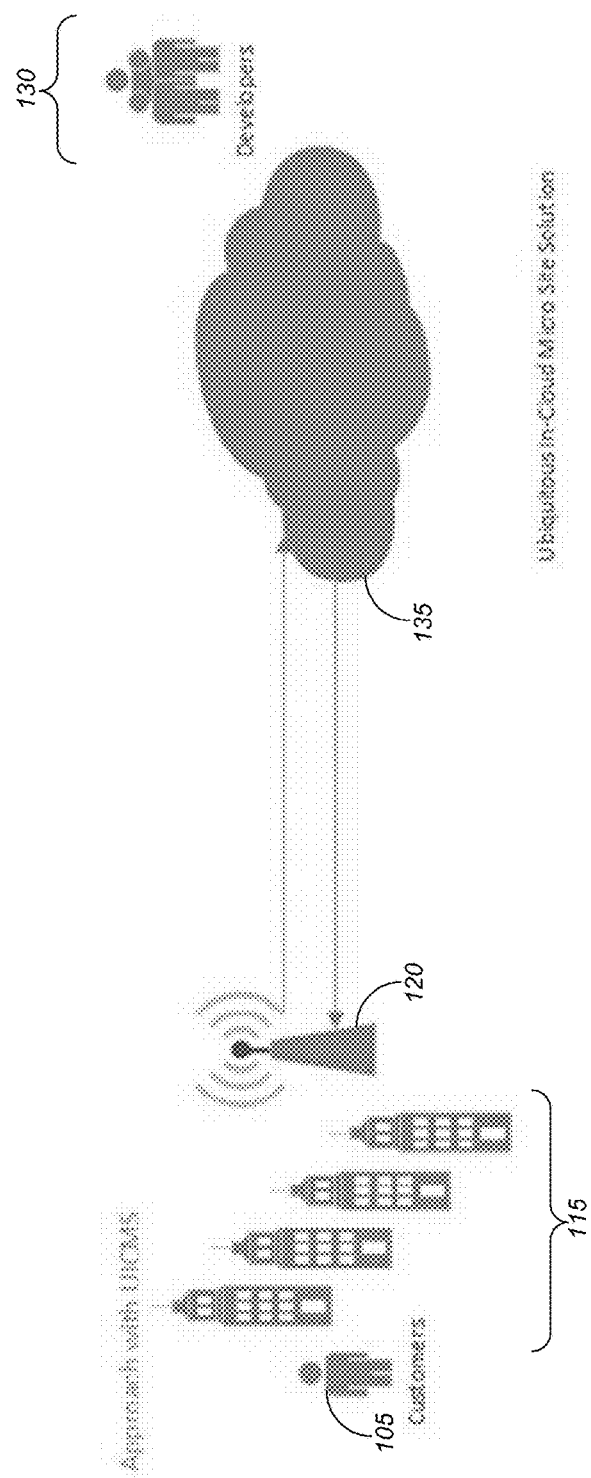
FIG. 1B illustrates network interactions for deploying microsites using an ubiquitous in-cloud microsite solution.

With reference to FIGS. 1A and 1B, FIG. 1A depicts the interactions of user acquiring access to a Wi-Fi network without using an ubiquitous in-cloud microsite solution (UICMS). FIG. 1B depicts interactions of acquiring access to a Wi-Fi network using a UICMS to perform the interactions. Thus, FIG. 1A illustrates an approach without UICMS, while FIG. 1B illustrates an approach using UICMS.

In FIG. 1A, system 100 comprises one or more customers 105a-105f (collectively, "105"), one or more user devices 110a-110f (collectively, "110"), one or more customer premises 115a-115f (collectively, "115"), one or more network devices (e.g., unified plug-ins and/or the like) 120a-120f (collectively, "120"), one or more unified web servers 125a-125f (collectively, "125"), and one or more developers 130. The number of network devices 120, unified web servers 125 and/or the like, results in greater logistical and infrastructure issues. This also includes a greater number of developers to establish, support, and maintain the individual sites to each of the individual network devices.

Quite differently, as shown in FIG. 1B, the approach with the UICMS 135 reduces the number of network devices and the number of unified web servers, thus greatly simplifying the logistics and infrastructure, thus requiring fewer developers 130 for support and maintenance.

Figure 2:
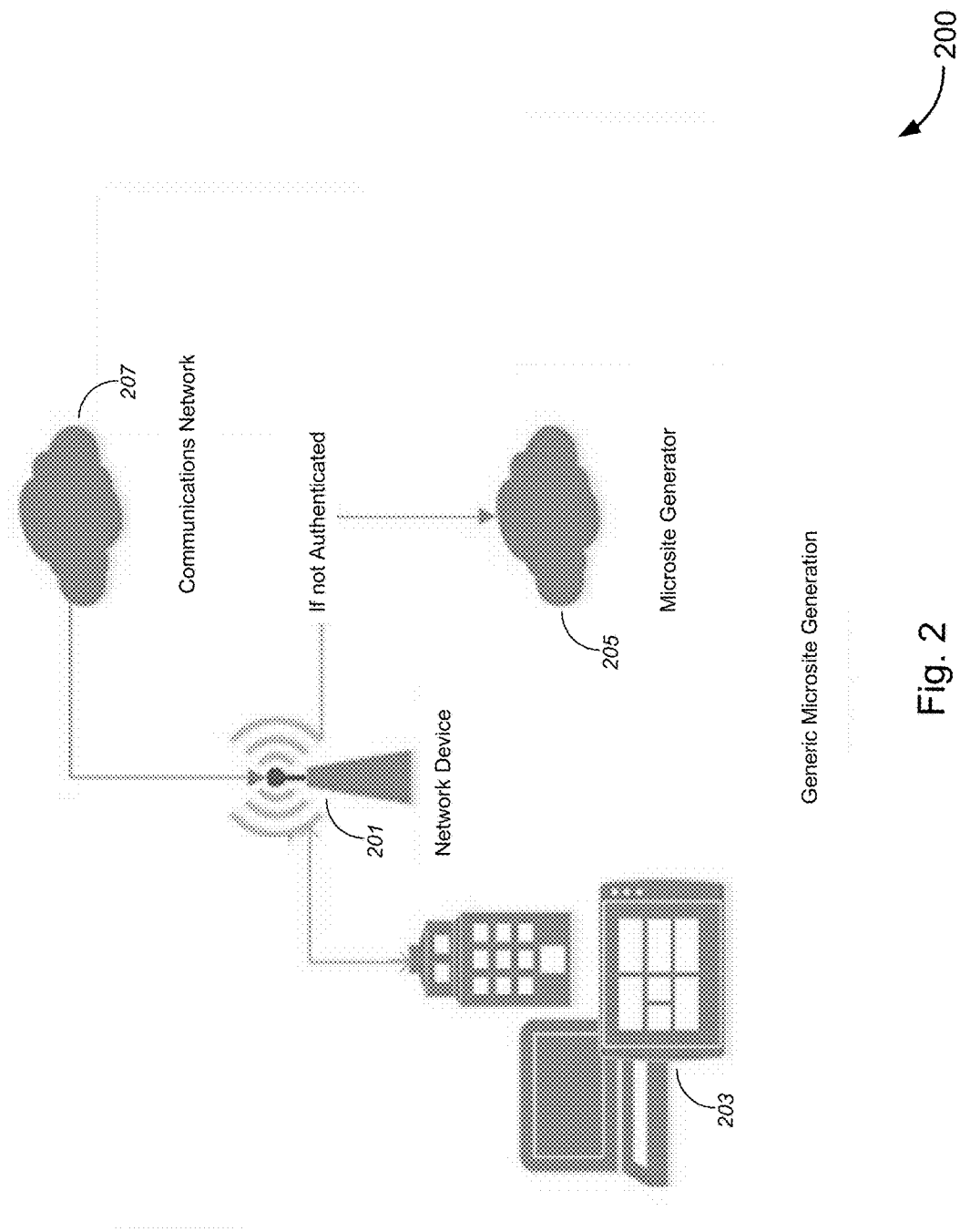
FIG. 2 a network diagram illustrating devices and interactions involved in ubiquitous in-cloud microsite generation.

FIG. 2 is a network diagram illustrating devices and interactions involved in UICMS generation 200. In one embodiment, the UICMS obviates the need to have a plug-in at the network device 201 and has a microsite generator 205 in the cloud. As used herein, the term "cloud" can mean any set of discrete or shared computing resources, such as a single server computer or a virtual machine running on a set of pooled computing resources, to name but two examples. The "cloud" can be located at any location (or multiple locations) that has network connectivity with the network device 201 and therefore can provide centralized administration of microsites on network devices 201 at many different locations.

A network device 201 can be any device that provides client devices (such as user devices 203) with access to a communication network 207 (which might be, for example, an Internet service provider's access network, and/or the Internet itself). Examples of network devices 201 include routers, WiFi access points, and the like. In a particular aspect, a network device 201 can provide controlled access to the communication network 207, such that only user devices 203 that are authenticated and/or authorized are permitted access to the network 207. In some cases, such authorization might be conditioned on payment of a fee (e.g., a per-use fee, a monthly subscription, or the like). In any event, many such devices 201 may include, for example, revenue eXtraction Gateways™ ("RXG") available from RG Networks™ and/or a Walled Garden™ device.

As shown in FIG. 2, microsites might be deployed via the cloud through a microsite generator, eliminating the need to use plug-ins at the network device(s) 201. Thus, microsite generator 205 can be compatible with several different types of network devices 201 across several different locations for deploying microsites to the various network devices 201. Authorized users are free to roam the communications network 207. In one embodiment, the communications network 207 is the Internet. It is to be understood that the communications network 207 is not limited to any particular kind of network, and can include networks of all sizes, such as a wide area network, a local area network, and personal area network. Communication from user devices 203 of a customer (e.g., from a customer premises) that might traditionally have come from the network device 201 are forced to the microsite generator 205 if the device is not authorized. Maintenance and microsites might be located in the Cloud, thus providing a central location to maintain and support.

Figure 3:
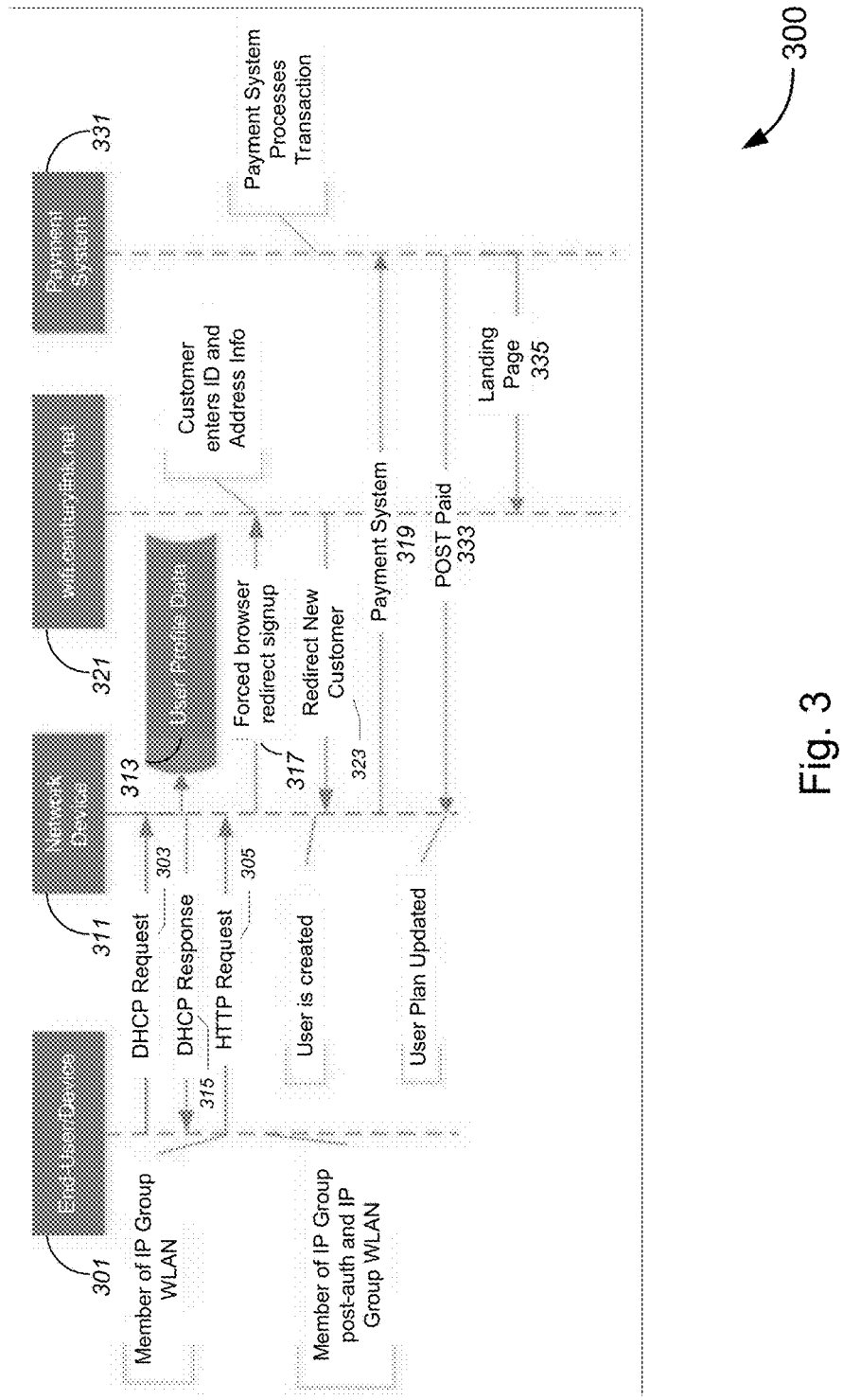
FIG. 3 illustrates interactions of the end-user/customer device, the network device, service provider, and payment system according to various embodiments.

FIG. 3 illustrates these interactions amongst the end-user/customer device 301, the network device 311, service provider 321 (or WiFi provided by the service provider), and the payment system 331 according to various embodiments. End-user/customer device 301 sends a DHCP request 303 to network device 311. Network device 311 obtains user profile data 313. In some embodiments, user profile data 313 can be used to customize what is displayed on the UICMS. For example, in some embodiments, user profile data is used to display a particular pricing plan based on a particular geographic area of the network device 311. In other embodiments, the specific end-user device 301 may be used to customize another aspect of the UICMS, such as advertisements. In yet other embodiments, existing user profile data 313 may be used to gain access to the network through network device 311. For example, user profile data 313 may be a user account for a customer who has already activated or subscribed to service from the service provider 321. The network device 311 can receive user credentials in the form of user profile data 313 from the user to determine whether or not the user is authorized to access the network. In certain embodiments, this determination occurs at the network device 311 or in other embodiments, at the service provider 321. Thus, the user profile data 313 may be user credentials, which can include, but are not limited to username and password, or other form of identification, which can be used to gain network access at multiple network devices 311 or access points. Network device 311 returns DHCP response 315 in response to DHCP request 303. End-user/customer device 301 then sends an HTTP request 305 to network device 311. If the network device does not recognize the end-user/customer device 301, communications from the network device are forced to a UICMS generator. Accordingly, the user device is redirected to a signup page 317 that is a generated as part of the UICMS. The customer then creates a user account. The signup page may require the customer to input information, including, but not limited to, desired user ID, address information, contact information, service plan, and other like information the service provider may need to create a user account, or desire from the customer. At this point, the user account is created at the network device 311. The service provider 321 signals the network device 311 to redirect the new customer 323 to payment system 331. Payment information is communicated 319 to payment system 331, where payment system 331 processes the transaction. Once the payment is processed, a post-payment communication 333 is made to the network device 311, and the user plan for the end-user/customer device 301 is updated at the network device 311. Subsequently, the end-user/customer device 311 is redirected to a landing page 335 instead of the UICMS.

Thus, the UICMS provides a solution that answers a business need to intake a customer for instant access to a wireless network, to receive payment for providing service, and also to perform the task of allowing the customer a transparent pass-through to utilize Wi-Fi service with a lower information technology cost of development and maintenance. UICMS sites, and interactions of the UICMS sites to and from network devices 311 (including gateway devices) are centralized within the UICMS allowing the provision of a smaller development footprint to support the product. Network devices 311 include, but are not limited to, gateway devices such as RxG devices and Walled Garden type devices. The UICMS might reside in the cloud utilizing an application grid of a service provider 321 (e.g., CenturyLink's AppGrid, and/or the like). The centralization of this product would reduce the information technology development support staff needed to create individual sites and the maintenance needed for multiple installs on multiple RxG type devices or multiple devices in the walled garden environment. The network device 311 could be any generic device that can be taught to speak or capable of speaking with the UICMS. The UICMS might continue to provide an instant access front-end platform for customer intake, payment acceptance, and to accept a handshake with a customer device allowing a customer 301 to access the network.

These various embodiments reduce information technology costs by centralizing and utilizing the same code set. In some embodiments, the UICMS is configured to interact with a payment accepting system 331 and a network device 311 or access point, based on a set of communication handshakes between a gateway-type network device 311 (e.g. an RxG type device or walled garden device), Payment System 331, and the UICMS. In further embodiments, the UICMS is implemented with a cloud based RxG device 311 and cloud based Payment Systems 331, to go along with the expansion cost reductions offered by the UICMS. The network device can be any device that controls access by a customer to the network. For example, the network device can include, but is not limited to, a RxG type device, a walled garden device, a wifi access point, and a wired network aggregator in an MDU, among other devices capable of performing such functions.

The UICMS performs actions between the customer 301 and the network device 311 and a payment system 331 via a set of rules and interactions using, for instance, the hypertext transfer protocol (HTTP). For example, creating a new account or an item, as discussed above, might be communicated to the UICMS to Create New Account if one did not exist, or if the MAC address or designated Key of such device was not present on the device.

FIGS. 4A-4F illustrate various example graphical user interfaces (GUI) for various external facing components of the UICMS, in accordance with the various embodiments. The UICMS is a multi-dwelling unit (MDU) subscriber microsite group. The MDU subscriber group has a specific microsite called "To portal," and a subgroup to that microsite called "wifiportal." The UICMS also provides the type of application programming interface (API) to use to communicate to the device, called "rxgAPI." The network device passes "g" or "group" based on a customer device identifier, including, but not limited to, the internet protocol (IP) network, IP sub-network, IP address, or media access control (MAC) address, thus giving the network device the capability to have control over the microsite being displayed. Static parameters might be used to identify what type of site is being run. This allows for a more customized portal compared with a generic microsite. For example, static parameters might indicate a group parameter ("g") to identify a microsite group, a policy parameter ("p") to identify network policies, a splash portal parameter ("sp") to identify the splash portal to be used, and communication type parameter ("portal_type") identifying the communication type to be used.

The UICMS can be used in places where instant activation is needed for a given product, giving the service provider an advantage over competitors from the perspective of the customer not waiting for service. The UICMS is also configured to interact with external financial systems that provide credit card billing, thus reducing subscriber abuse, and/or the likelihood that payment is not collected in high churn rate areas. The system also has the ability to display pricing plans based on persistent profiles based on the location or for different areas. This allows the area to accept flat-rate credit card billing one time and interact with recurring credit card systems.

Figure 4A:
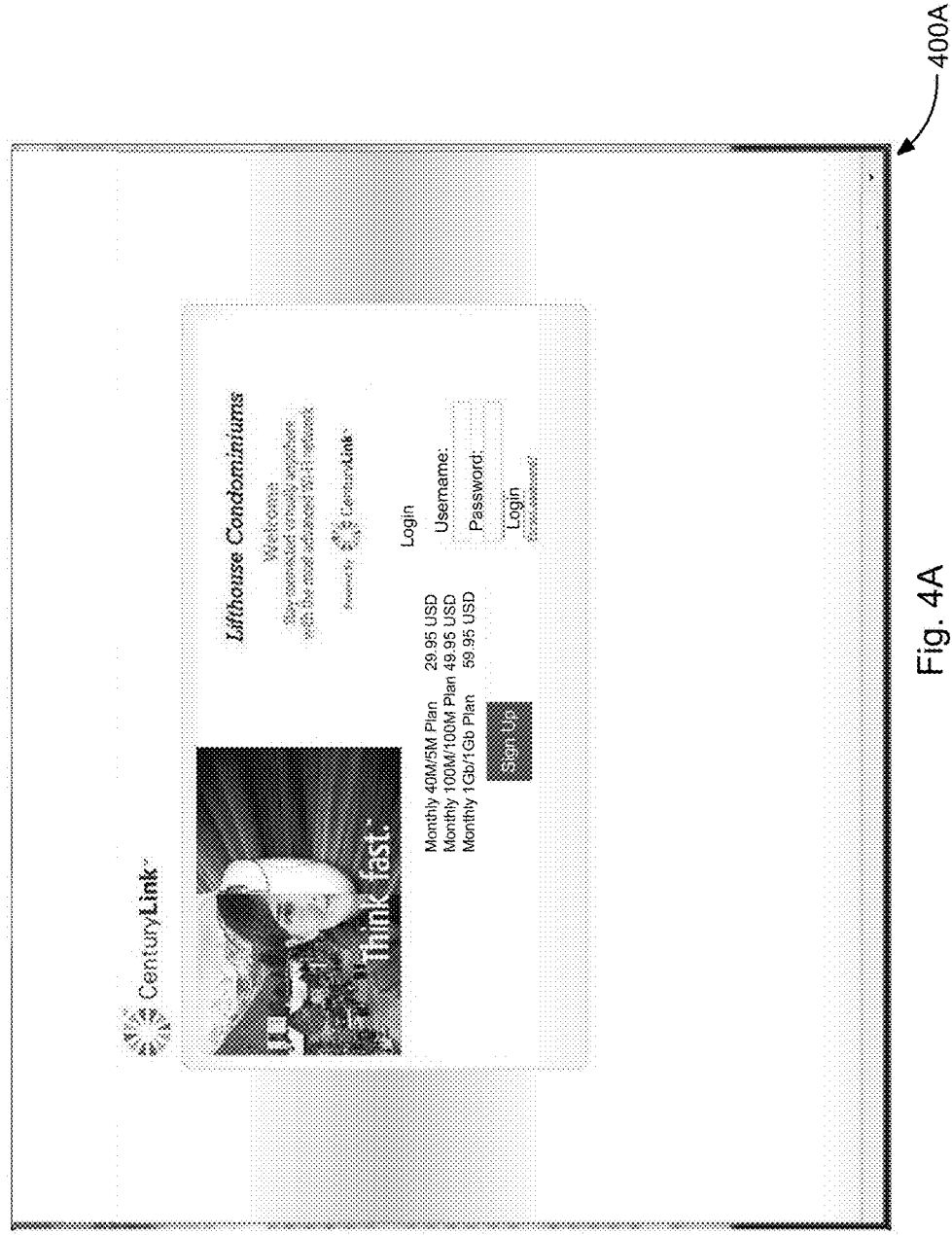
FIG. 4A is an example GUI of an initial check page of a microsite.

FIG. 4A illustrates an example GUI of an initial check microsite 400A, to which a customer is redirected if the network device determines that the customer is not an authorized user. When the customer arrives at this webpage, the customer can login with a previously created user ID or choose to sign up.

Figure 4B:
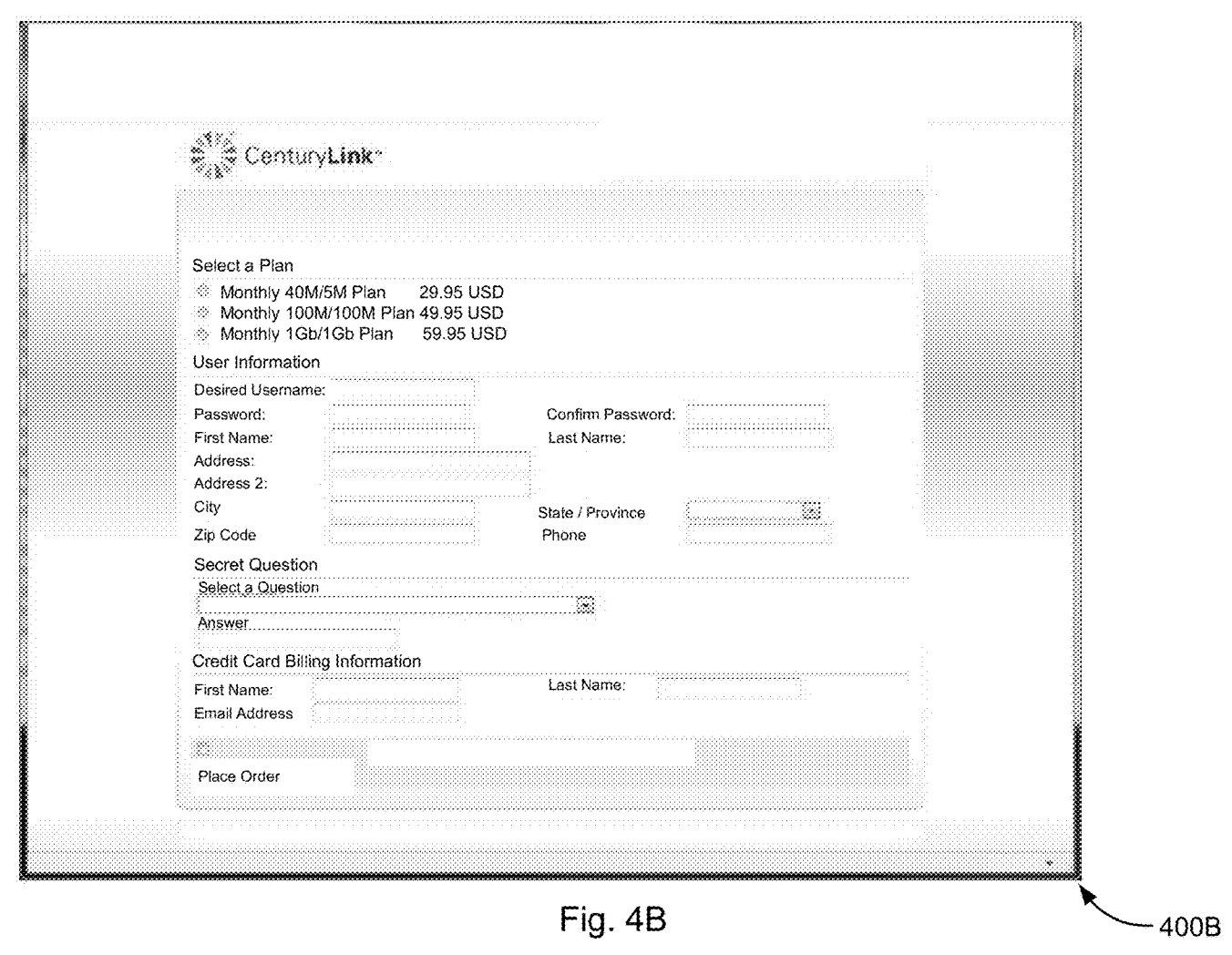

FIG. 4B illustrates an example GUI of a sign-up microsite 400B, on which the customer can sign up for services and/or select a plan. On this microsite 400B, the customer can select a plan, input user information, including a desired username, password, first name, address, contact information, and billing information.

Figure 4C:
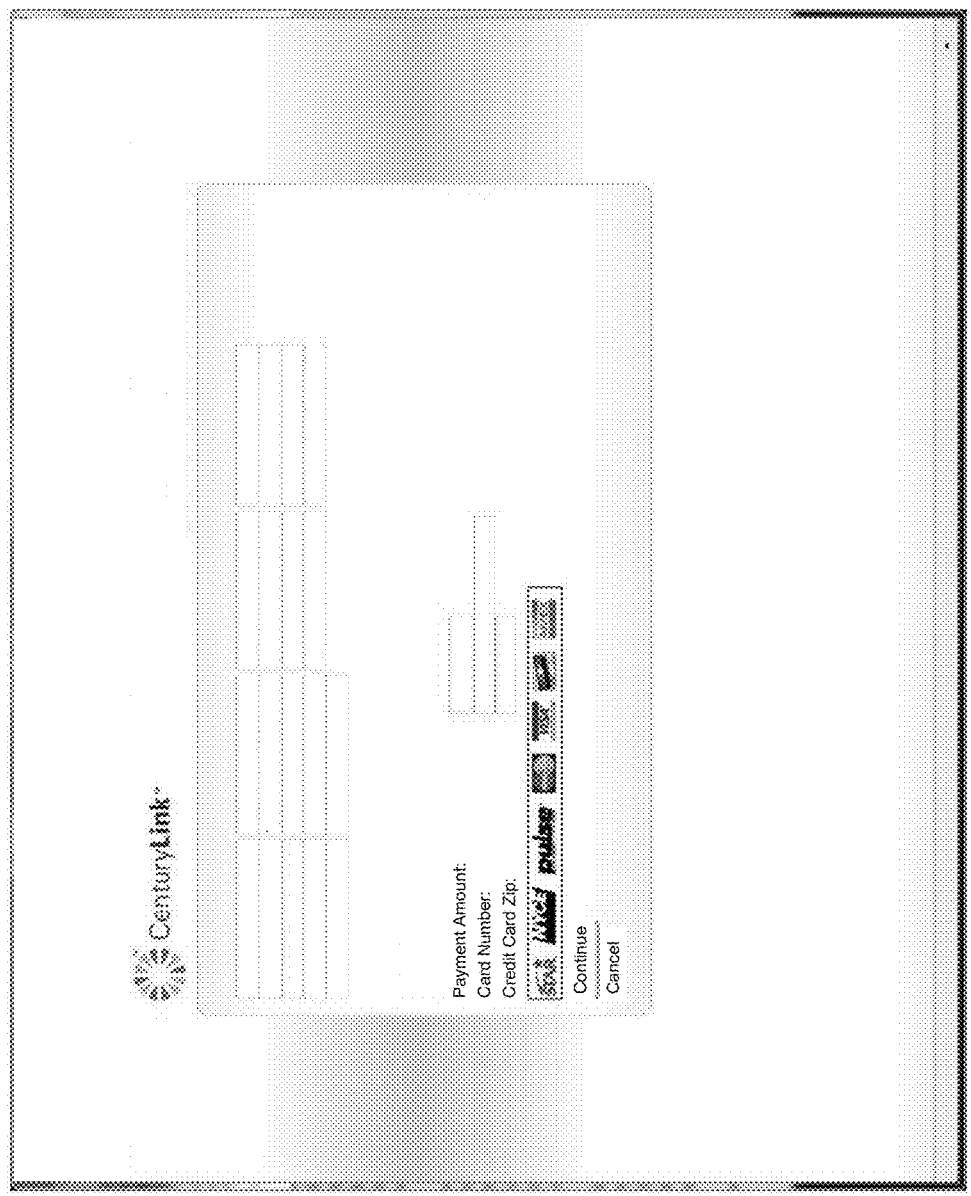
FIG. 4C is an example GUI of a credit card authorization page of the microsite.

FIG. 4C illustrates an example GUI of a credit card authorization microsite 400C, on which a credit card/billing system site or portal might be displayed. In one embodiment, an external financial institution provides components needed to complete the billing transaction, and the UICMS site is branded accordingly.

Figure 4D:
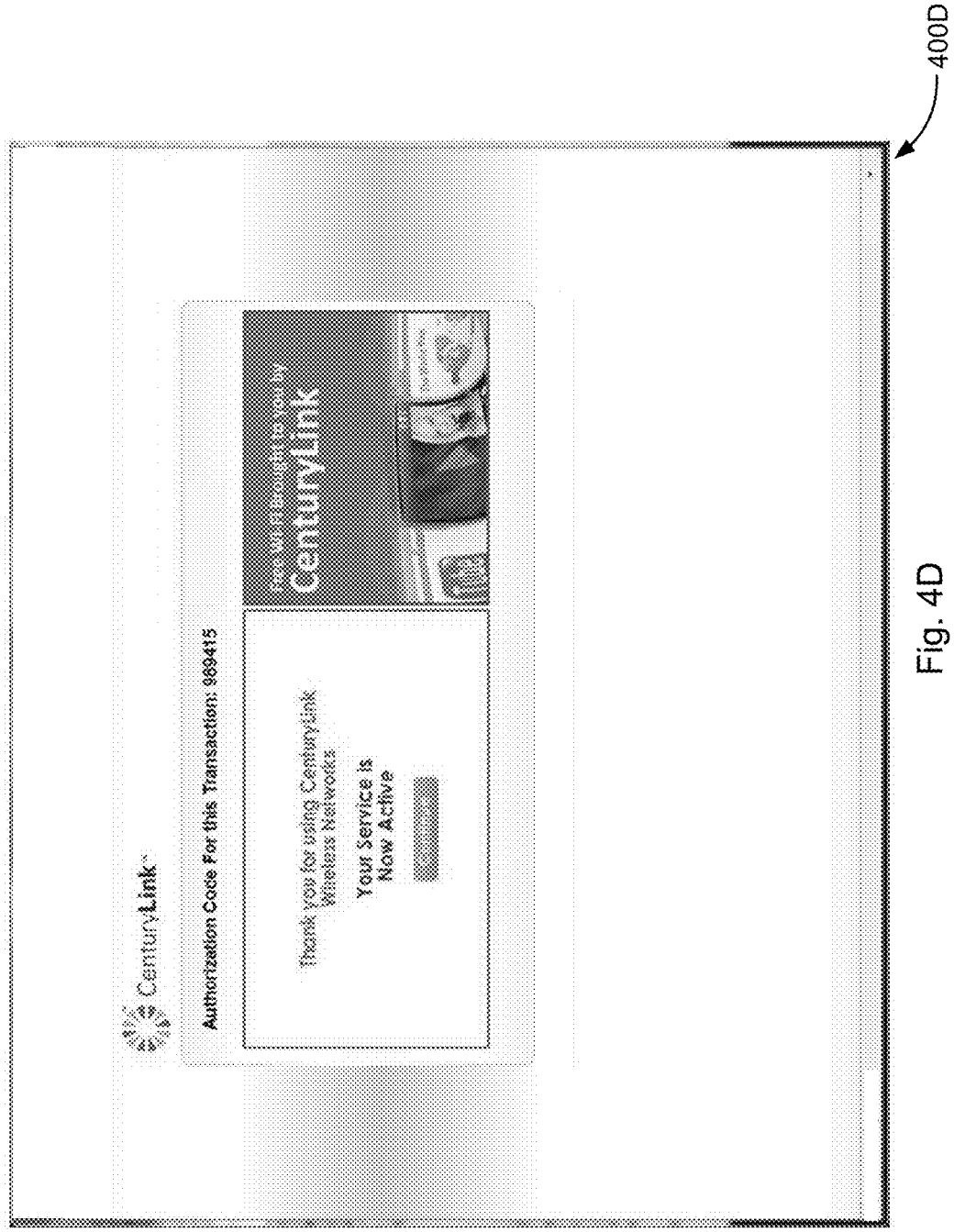
FIG. 4D is an example GUI of a "free-to-roam" page of the microsite.

FIG. 4D illustrates an example GUI of a "free-to-roam" microsite 400D, which might represent a completed transaction page. Here, a handshake has successfully taken place, authenticating the user, and allowing the user device to utilize the network of the service provider.

Figure 4E:
FIG. 4E is an example GUI of an active session of a user device connected to a communications network.

FIG. 4E illustrates an example GUI of an active session 400E. In one embodiment, the customer is redirected to a landing page, such as a service provider website, after the continue button is pressed. In other embodiments, no such redirecting takes place and the customer is free to browse the internet directly from "free-to-roam" microsite 400D.

Figure 4F:
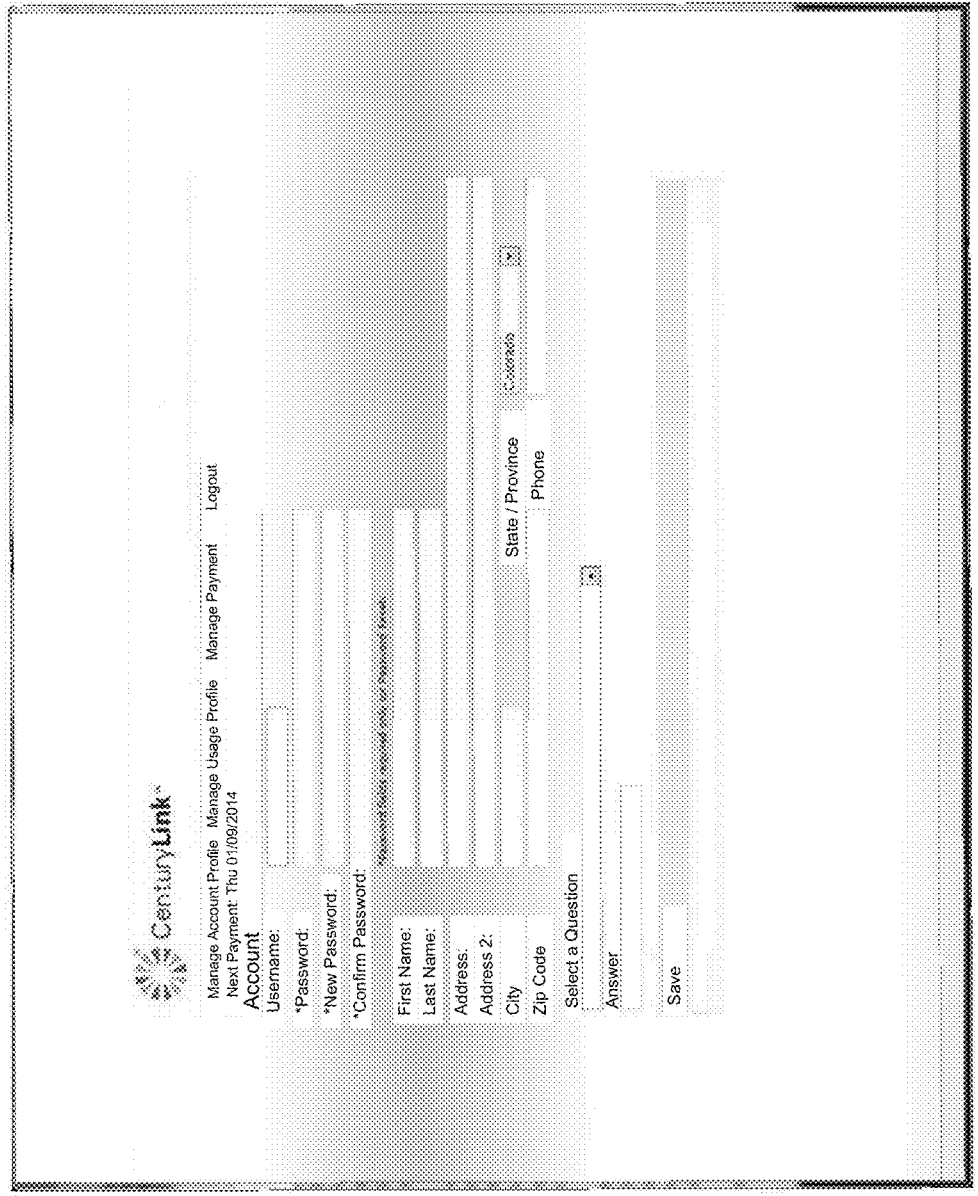
FIG. 4F is an example GUI of an account management page of the microsite.

FIG. 4F illustrates an example GUI of an account/profile maintenance microsite 400F from which an authorized user may manage details of their account, including, but not limited to the capabilities: account profile management, manage usage plan (based on configured profile), and manage payments (including cancellations). In other embodiments, other account details of the user account may be changed.

Figure 5:
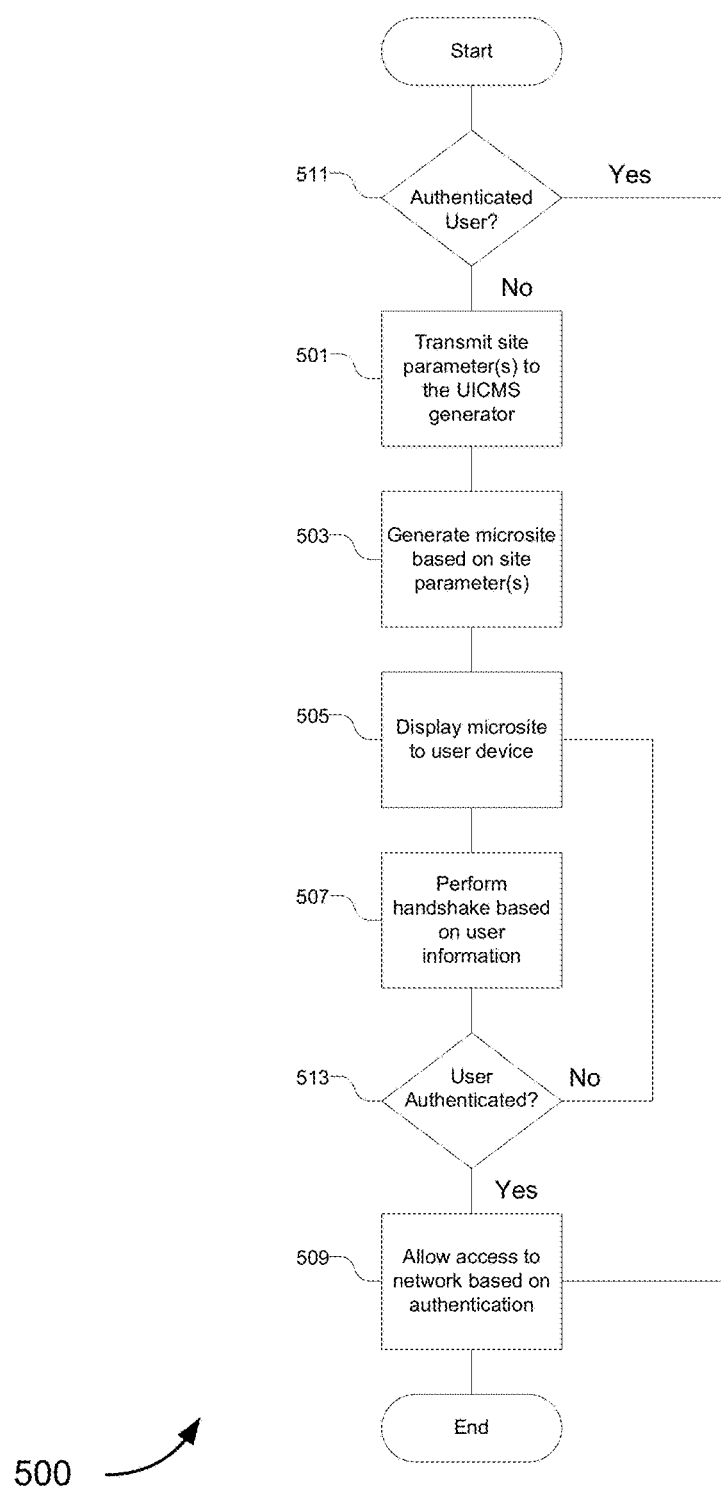
FIG. 5 is a flow diagram illustrating a method implementing a ubiquitous in-cloud microsite solution according to various embodiments.

FIG. 5 is a flow diagram illustrating a method of implementing a UICMS 500 according to various embodiments. While the techniques and procedures of the method 500 are depicted and/or described in a certain order for purposes of illustration, it should be appreciated that certain procedures may be reordered and/or omitted within the scope of various embodiments. Moreover, while the method illustrated by FIG. 5 can be implemented by using any suitable hardware, including those discussed in the embodiments above.

At decision block 511, the network device determines whether a connected user device is an authenticated user. If so, the device is given "free-to-roam" access of the communications network. If the user is not authenticated, communication from a network device is forced to a UICMS generator. At block 501, the network device transmits site parameters to a UICMS generator. Site parameters allow the network device to control what information or what kind of microsite is displayed to the user device. In one embodiment, the network device retrieves user profile data. User profile data can be used to display a particular pricing plan based on a particular geographic area of the network device. In other embodiments, user profile data is specific to the end-user device and may be used to customize another aspect of the UICMS, such as advertisements. In yet other embodiments, the network device uses static parameters to identify what type of site is being run, for example by identifying an API used by the microsite. At block 503, a microsite is generated by the UICMS generator based on the site parameters received from the network device. Once generated, the microsite can be deployed at the network device. In some embodiments, the network device is a generic gateway type device on a local network capable of interacting with the UICMS generator. In other embodiments, the network device can be a cloud-based RxG type device or a walled garden device. At block 505, the microsite is displayed to the user device. In one embodiment, all network communications from the user device are directed to the microsite. Thus, the user device is unable to access the communications network, and instead is presented with the microsite. For example, in one embodiment, an HTTP request from a user device is redirected by the network device to the microsite. As described above, the microsite may be deployed directly from the network device to the user device or from a cloud-based network device. At block 507, a handshake is performed, by the microsite, based on user information. User information can be obtained by, or entered into the microsite. User information includes, but is not limited to, a desired username, password, first name, address, contact information, and billing information. In one embodiment, an account must be created, and billing information is entered by the customer to the microsite. The billing information is used by the microsite to complete a payment transaction before the account or user device is authenticated to access the network. Thus, the microsite allows the network device to perform a handshake with a payment system to complete the payment transaction, and also performs a handshake between the network device and user device to authenticate the user device. At decision block 513, the network device determines whether the user is authenticated. If the user is not authenticated, the network device redirects the user device to the microsite at block 505. At block 509, if the user is authenticated, the user device is allowed access to the communications network based on the authentication. In one embodiment, a handshake occurs between the network device and the user device authenticating the user device based on whether or not a payment was successful.

Figure 6:
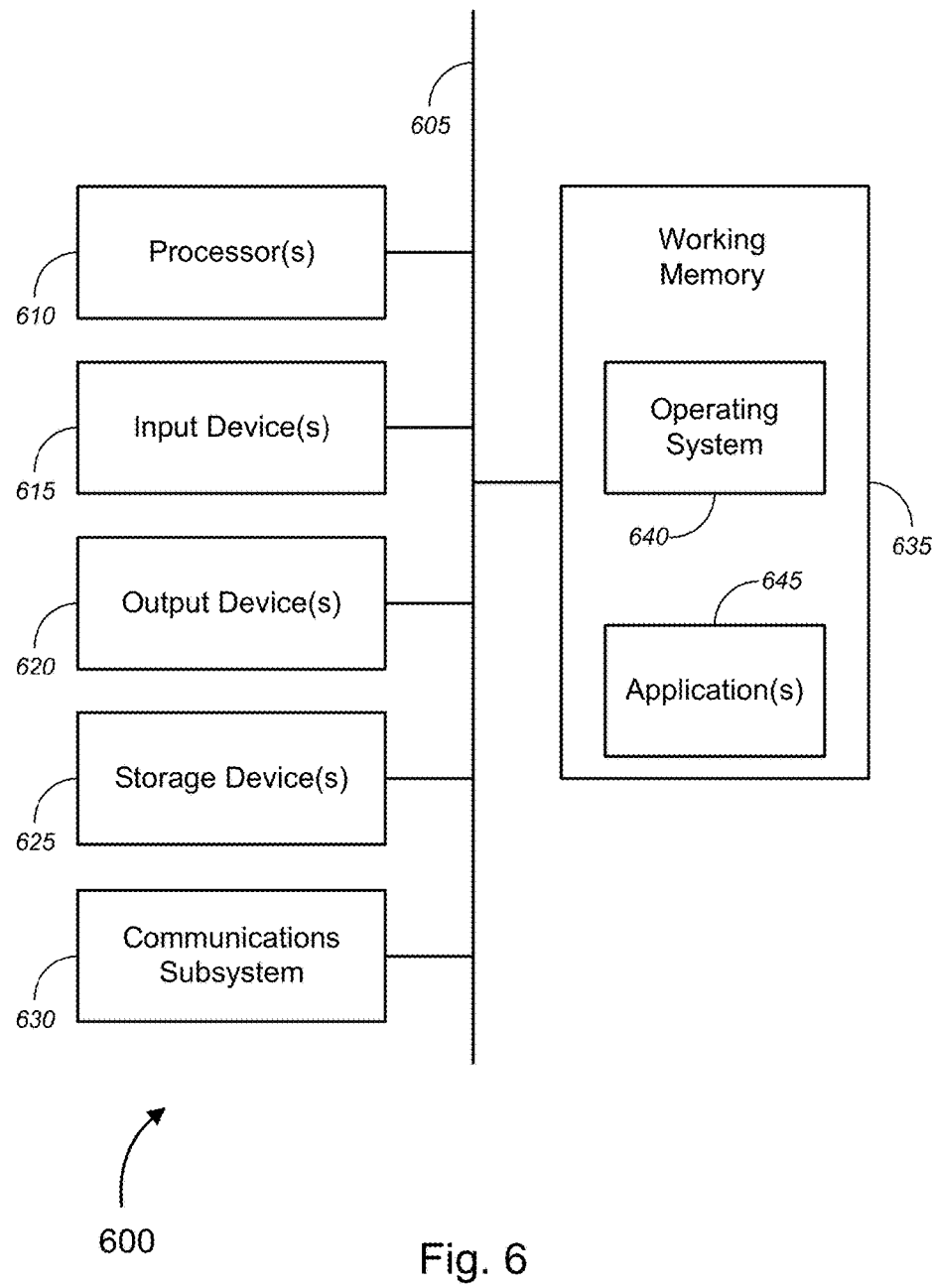
FIG. 6 is a schematic illustration of a computer system for implementing a ubiquitous in-cloud microsite solution according to various embodiments.

FIG. 6 is a schematic illustration of one embodiment of a computer system 600 that can perform the methods provided by various other embodiments, as described herein, and/or can perform the functions of processing devices, local or user computing systems or user devices 605, or other computer systems as described above. It should be noted that FIG. 6 is meant only to provide a generalized illustration of various components, of which one or more, or none, of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors, or one or more special-purpose processors such as digital signal processing chips, graphics acceleration processors, or the like; one or more input devices 615, which can include without limitation a mouse, a keyboard, or the like; and one or more output devices 620, which can include without limitation a display device, a printer, or the like.

The computer system 600 may further include, or be in communication with, one or more storage devices 625. The one or more storage devices 625 can comprise, without limitation, local and/or network accessible storage, or can include, without limitation, a disk drive, a drive array, an optical storage device, a solid-state storage device, or the like. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 600 might also include a communications subsystem 630, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 630 may permit data to be exchanged with a network with other computer systems, with any other devices described herein, or with any combination of network, systems, and devices. According to some embodiments, the network might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 600 will further comprise a working memory 635, which can include a RAM or ROM device, as described above.

The computer system 600 may also comprise software elements, shown as being currently located within the working memory 635, including an operating system 640, device drivers, executable libraries, or other code. The software elements may include one or more application programs 645, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 625 described above. In some cases, the storage medium might be incorporated within a computer system, such as the system 600. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 600, or might take the form of source or installable code. The source or installable code, upon compilation, installation, or both compilation and installation, on the computer system 600 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 600, to perform methods in accordance with various embodiments of the invention. According to a set of embodiments, some or all of the procedures of such methods might be performed by the computer system 600 in response to processor 610 executing one or more sequences of one or more instructions. The one or more instructions might be incorporated into the operating system 640 or other code that may be contained in the working memory 635, such as an application program 645. Such instructions may be read into the working memory 635 from another computer readable medium, such as one or more of the storage devices 625. Merely by way of example, execution of the sequences of instructions contained in the working memory 635 might cause the one or more processors 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions or code to the one or more processors 610 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630, or the media by which the communications subsystem 630 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
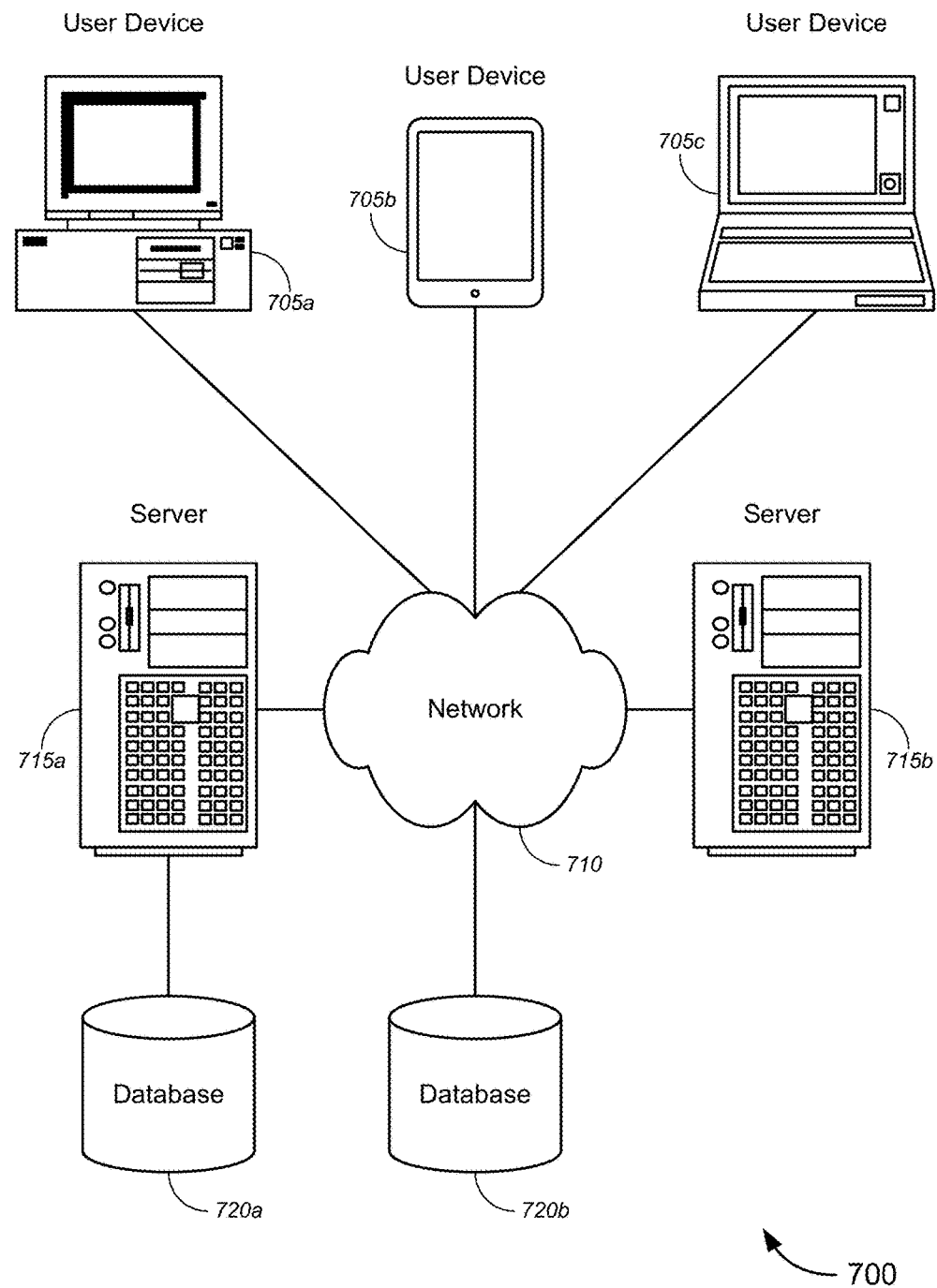
FIG. 7 is a schematic diagram of a system for implementing a ubiquitous in-cloud microsite solution according to various embodiments.

As noted above, a set of embodiments comprises methods and systems for implementing ubiquitous in-cloud microsite generator for high speed data customer intake and activation. FIG. 7 illustrates a schematic diagram of a system 700 that can be used in accordance with one set of embodiments. The system 700 can include one or more user computers or user devices 705. A user computer or user device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 705 can also have any of a variety of applications, including one or more applications configured to perform methods provided by various embodiments (as described above, for example), as well as one or more office applications, database client and/or server applications, and/or web browser applications. Alternatively, a user computer or user device 705 can be any other electronic device, such as a thin-client computer, Internet-enabled mobile telephone, and/or personal digital assistant, capable of communicating via a network (e.g., the network 710 described below) and/or of displaying and navigating web pages or other types of electronic documents. Although the exemplary system 700 is shown with three user computers or user devices 705, any number of user computers or user devices can be supported.

Certain embodiments operate in a networked environment, which can include a network 710. The network 710 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 710 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 705 and/or another server 715. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer or user device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer or user device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

Various modifications and additions can be made to the embodiments discussed without departing from the scope of the invention. For example, while the embodiments described above refer to particular features, the scope of this invention also includes embodiments having different combination of features and embodiments that do not include all of the above described features.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing an in-cloud microsite solution, comprising:
   transmitting one or more site parameters from a network device to an in-cloud microsite generator, the network device communicatively coupled to a user device, wherein, when a user of the user device is not authenticated, the network device provides selective access for user devices to communicate over a communications network;
   based on a determination that the user of the user device is not authenticated, generating, with the in cloud microsite generator, a microsite based on the one or more site parameters received from the network device;
   directing, via the network device, the user device to the microsite generated by the in-cloud microsite generator;
   authenticating the user device via the microsite, wherein the microsite performs handshakes between the network device and an at least one second device to authenticate the user device;
   receiving user profile data from the user device; and
   allowing the user device to access the communications network based on successful authentication of the user device and a determination that the user profile data authorizes access to the communications network.

2. The method of claim 1, wherein authenticating the user device further comprises processing a payment from the user device via the microsite.

3. The method of claim 2, wherein the at least one second device is a payment system.

4. The method of claim 1, wherein the one or more site parameters comprise one or more static parameters, wherein the one or more static parameters indicate one or more of a group, policy, splash portal, application programming interface, or communication type of the microsite.

5. The method of claim 1, wherein the one or more site parameters comprise a parameter indicative of a geographic location of the user device.

6. The method of claim 1, wherein the one or more site parameters comprise a parameter based on an internet protocol address.

7. The method of claim 1, wherein the one or more site parameters comprise a parameter based on a media access control address.

8. A system for in-cloud microsite generation, comprising:
an in-cloud microsite generator; and
a network device communicatively coupled to the in-cloud microsite generator, the network device configured to communicate with the in-cloud microsite generator, the network device further configured to communicate with an at least one user device, wherein, when a user of the at least one user device is not authenticated, the network device provides selective access for the at least one user device to communicate over a communications network;
wherein the in-cloud microsite generator is configured to:
receive one or more site parameters from the network device;
generate, based on a determination that the user of the at least one user device is not authenticated, a microsite based on the one or more site parameters; and
deploy the microsite at the network device;
wherein the network device is configured to:
transmit one or more site parameters to the ubiquitous in-cloud microsite generator;
direct the at least one user device to a microsite generated by the in-cloud microsite generator;
receive user information from the at least one user device via the microsite;
perform handshakes with an at least one second device;
receive user profile data from the at least one user device; and
allow the at least one user device to access the communications network based at least in part on a determination that the user profile data authorizes access to the communications network.

9. The system of claim 8, wherein the network device is further configured to process a payment from the user device via the microsite.

10. The system of claim 9, wherein the at least one second device is a payment system.

11. The system of claim 8, wherein the network device is a wireless access point.

12. The system of claim 8, wherein the network device is a wired network aggregator in a multi-dwelling unit.

13. The system of claim 8, wherein the in-cloud microsite generator is further configured to:
support a plurality of network devices other than the network device;
receive a respective one or more site parameters from each of the plurality of network devices;
generate a respective microsite based on the respective one or more site parameters received from each of the plurality of network devices; and
deploy the respective microsite at each of the plurality of network devices.

14. The system of claim 8, wherein the one or more site parameters comprise static parameters, wherein the static parameters indicate one or more of a group, policy, splash portal, application programming interface, or communication type of the microsite.

15. The system of claim 8, wherein the one or more site parameters are indicative of a geographic location of the user device.

16. The system of claim 8, wherein the one or more site parameters are based on an internet protocol address of the at least one user device.

17. The system of claim 8, wherein the one or more site parameters are based on a media access control address of the at least one user device.

18. The system of claim 8, wherein the network device is further configured to force communications of the user device to the microsite.

19. A network device for deploying an in-cloud microsite solution, comprising:
a communications unit configured to communicate with an in-cloud microsite generator, the communications unit further configured to allow an at least one user device to communicate over a communications network, wherein, when a user of the at least one user device is not authenticated, the network device provides selective access for the at least one user device to communicate over a communications network;
at least one microprocessor; and
a non-transitory computer readable medium which contains instructions that, when executed by the at least one microprocessor, causes the network device to:
transmit one or more site parameters to the in-cloud microsite generator;
direct, based on a determination that the user of the at least one user device is not authenticated, the at least one user device to a microsite generated by the in-cloud microsite generator;
perform handshakes via the microsite with an at least one second device;
receive user profile data from the at least one user device; and
allow the user device to access a communications network based on the handshakes and a determination that the user profile data authorizes access to the communications network.

20. The network device of claim 19, wherein the non-transitory computer readable medium contains further instructions, that when executed by the at least one microprocessor, causes the network device to:
process a payment from the user device via the microsite.

21. The network device of claim 20, wherein the at least one second device is a payment system.

22. The network device of claim 19, wherein the one or more site parameters comprise static parameters, wherein the static parameters indicate one or more of a group, policy, splash portal, application programming interface, or communication type of the microsite.

23. The system of claim 19, wherein the network device is a wireless access point.

24. The system of claim 19, wherein the network device is a wired network aggregator in a multi-dwelling unit.

* * * * *